US012283027B2

(12) United States Patent
Yuan (10) Patent No.: US 12,283,027 B2
(45) Date of Patent: Apr. 22, 2025

(54) PTZ MASKING CONTROL

(71) Applicant: Axis AB, Lund (SE)

(72) Inventor: Song Yuan, Lund (SE)

(73) Assignee: AXIS AB, Lund (SE)

( * ) Notice: Subject to any disclaimer, the term of this patent is extended or adjusted under 35 U.S.C. 154(b) by 66 days.

(21) Appl. No.: 18/302,362

(22) Filed: Apr. 18, 2023

(65) Prior Publication Data

US 2023/0342888 A1    Oct. 26, 2023

(30) Foreign Application Priority Data

Apr. 26, 2022 (EP) .................................. 22170025

(51) Int. Cl.
*G06T 5/70* (2024.01)
*G06T 5/75* (2024.01)
*G08B 13/196* (2006.01)
*H04N 7/18* (2006.01)
*H04N 23/695* (2023.01)

(52) U.S. Cl.
CPC .................. *G06T 5/70* (2024.01); *G06T 5/75* (2024.01); *G08B 13/19686* (2013.01); *H04N 7/181* (2013.01); *G06T 2207/20224* (2013.01); *H04N 23/695* (2023.01)

(58) Field of Classification Search
CPC .. H04N 23/695; H04N 7/181; H04N 21/4318; H04N 21/4408; H04N 21/45457; H04N 21/45455; G08B 13/19686; G06T 5/70; G06T 5/75; G06T 2207/20224
See application file for complete search history.

(56) References Cited

U.S. PATENT DOCUMENTS

| | | | |
|---|---|---|---|
| 6,509,926 B1 * | 1/2003 | Mills ................. | G08B 13/1968 348/E7.087 |
| 6,727,938 B1 * | 4/2004 | Randall ............ | G08B 13/19606 348/E7.087 |
| 7,825,950 B2 | 11/2010 | Rottmann | |
| 9,485,432 B1 * | 11/2016 | Medasani ............ | H04N 23/951 |
| 10,297,126 B2 | 5/2019 | Rao | |
| 10,991,397 B2 * | 4/2021 | Michaud ................ | G11B 27/00 |
| 11,277,557 B1 * | 3/2022 | Vemury .................. | G06T 7/70 |

(Continued)

FOREIGN PATENT DOCUMENTS

| | | |
|---|---|---|
| EP | 3640903 A1 | 4/2020 |
| WO | 2012/151777 A1 | 11/2012 |

OTHER PUBLICATIONS

Extended European Search Report dated Sep. 26, 2022 for European Patent Application No. 22170025.5.

*Primary Examiner* — Brian P Yenke
(74) *Attorney, Agent, or Firm* — Volpe Koenig (57) ABSTRACT

A method of generating an output video stream is provided, including receiving a first input video stream from at least one first camera capturing a scene, receiving a second input video stream from a second camera only partially capturing the scene, and generating an output video stream from the first input video stream, including, in response to determining that a particular area of the output video stream depicts a part of the scene depicted in the second input video stream, refraining from, or at least reducing a level of, a masking of the particular area of the output video stream. A corresponding device, camera monitoring system, computer program and computer program product are also provided.

20 Claims, 4 Drawing Sheets

(56) References Cited

U.S. PATENT DOCUMENTS

| | | | | |
|---|---|---|---|---|
| 11,825,241 | B2* | 11/2023 | Lundberg | H04N 23/667 |
| 12,118,731 | B2* | 10/2024 | Hassbring | G06T 7/20 |
| 2002/0005902 | A1* | 1/2002 | Yuen | H04N 23/66 |
| | | | | 348/169 |
| 2004/0081338 | A1* | 4/2004 | Takenaka | G06T 5/70 |
| | | | | 382/118 |
| 2005/0157169 | A1* | 7/2005 | Brodsky | G08B 13/19652 |
| | | | | 348/169 |
| 2005/0275723 | A1* | 12/2005 | Sablak | G06V 10/25 |
| | | | | 348/169 |
| 2006/0056056 | A1* | 3/2006 | Ahiska | G08B 13/19643 |
| | | | | 359/690 |
| 2006/0158527 | A1* | 7/2006 | Kang | H04N 23/635 |
| | | | | 348/E5.042 |
| 2006/0206911 | A1* | 9/2006 | Kim | H04N 5/2723 |
| | | | | 725/12 |
| 2008/0036860 | A1* | 2/2008 | Addy | G08B 13/19652 |
| | | | | 348/143 |
| 2009/0046147 | A1* | 2/2009 | Henson | H04N 7/181 |
| | | | | 348/143 |
| 2011/0064327 | A1* | 3/2011 | Dagher | G06T 5/50 |
| | | | | 382/284 |
| 2012/0038776 | A1 | 2/2012 | Ahiska et al. | |
| 2012/0098854 | A1* | 4/2012 | Ohnishi | H04N 7/18 |
| | | | | 345/626 |
| 2013/0021433 | A1 | 1/2013 | Belsarkar et al. | |
| 2014/0118545 | A1* | 5/2014 | Iwasaki | H04N 7/185 |
| | | | | 348/143 |
| 2014/0334676 | A1* | 11/2014 | Skans | G06T 7/292 |
| | | | | 382/103 |
| 2016/0050889 | A1* | 2/2016 | Wenger | F03D 80/10 |
| | | | | 348/47 |
| 2016/0105615 | A1* | 4/2016 | Chang | H04N 23/45 |
| | | | | 348/267 |
| 2016/0150188 | A1* | 5/2016 | Ha | H04N 23/69 |
| | | | | 348/143 |
| 2017/0026679 | A1 | 1/2017 | Kamei et al. | |
| 2018/0075587 | A1* | 3/2018 | Swami | H04N 5/265 |
| 2018/0181766 | A1 | 6/2018 | Engel et al. | |
| 2018/0190090 | A1* | 7/2018 | Ardo | G06F 3/013 |
| 2018/0359449 | A1* | 12/2018 | Matsumoto | G08B 13/19686 |
| 2019/0122082 | A1* | 4/2019 | Cuban | G06T 7/73 |
| 2019/0132492 | A1* | 5/2019 | Paluri | H04N 21/4788 |
| 2019/0205659 | A1* | 7/2019 | Cuban | G06V 20/41 |
| 2019/0304506 | A1* | 10/2019 | Michaud | H04N 5/272 |
| 2020/0202689 | A1* | 6/2020 | Yuan | H04N 19/132 |
| 2020/0250834 | A1* | 8/2020 | Heck | G06T 7/73 |
| 2020/0394411 | A1* | 12/2020 | Dahlberg | G06V 40/172 |
| 2021/0049772 | A1* | 2/2021 | Buibas | G06Q 30/0601 |
| 2021/0233371 | A1 | 7/2021 | Brake et al. | |
| 2021/0383018 | A1* | 12/2021 | Keskikangas | G06F 21/6209 |
| 2022/0109822 | A1* | 4/2022 | Winter | H04N 23/695 |
| 2022/0138468 | A1* | 5/2022 | Edpalm | H04N 7/18 |
| | | | | 382/181 |
| 2022/0201312 | A1* | 6/2022 | Yuan | H04L 9/3236 |
| 2023/0177661 | A1* | 6/2023 | Ericson | G08B 13/19667 |
| 2023/0298182 | A1* | 9/2023 | Hassbring | G06T 5/80 |
| 2023/0368119 | A1* | 11/2023 | Lin | G06K 7/1404 |
| 2024/0007732 | A1* | 1/2024 | Jeong | G06T 5/70 |
| 2024/0185610 | A1* | 6/2024 | Singh | G06T 5/50 |
| 2024/0296679 | A1* | 9/2024 | Benderius | G06T 5/92 |
| 2024/0331161 | A1* | 10/2024 | Keskikangas | G06V 10/80 |
| 2024/0362893 | A1* | 10/2024 | Hassbring | G06V 10/28 |

* cited by examiner

PTZ MASKING CONTROL

FIELD OF INVENTION

The present disclosure relates to (privacy) masking in video streams generated in a camera monitoring system. In particular, the present disclosure relates to such masking when receiving multiple video streams from multiple cameras capturing a same scene.

TECHNICAL BACKGROUND

In modern camera monitoring systems, multiple cameras may be used to capture a same scene. For example, one or more cameras may be used to generate an overview of the scene, while one or more other cameras may be used to generate a more detailed view of the scene. A camera used to generate the overview of the scene may for example be a camera having a greater field-of-view (FOV), such that it may capture a larger part of the scene. Other examples may include combining video streams from multiple cameras each having a lesser FOV and each capturing different parts of the scene, in order to form a combined video stream still capturing a larger part of the scene. To generate the more detailed view of the scene, one may preferably use a so-called pan-tilt-zoom (PTZ) camera, which may be capable of e.g., zooming in on an object or area of interest in the scene, and to e.g., provide more details about such an object or area than is available from the overview of the scene alone. A user of the camera monitoring system may then for example use the overview of the scene to identify a presence of an object or area of interest, and then use the PTZ camera to study the object or area in more detail (e.g., by zooming in closer to an object of interest, and/or by using pan and/or tilt functionality of the PTZ camera to follow the object of interest if it moves across the scene).

In such camera monitoring systems, it is not uncommon to have different levels of authorization for different users, and viewing the more detailed view of the scene may require a higher level of authorization than what is required for viewing only the overview of the scene. This because the overview of the scene provides less detail about individual objects (such as persons) than the PTZ camera. In particular, to further reduce the authorization level required to view the overview of the scene, (privacy) masking can be applied in the overview of the scene such that e.g., identities of persons, license-plates, or similar, are hidden and not recoverable by a low-level authorized user watching the overview of the scene. For the PTZ camera, on the other hand, such masking is usually not performed, such that the full potential of the PTZ camera can be utilized if an object of interest is found, and the level of authorization required to view the more detailed view of the scene generated by the PTZ camera is therefore usually higher.

If the PTZ camera is used to e.g., follow a live event (e.g., to track the movement of an object of interest), it may be desirable to use also the overview of the scene to improve situational awareness. For example, if having zoomed in on an object of interest using the PTZ camera, becoming aware of where exactly in the scene the object is currently located may be difficult if using only the more detailed view of the scene. By also using the overview of the scene, such locating of the object within the scene may be less difficult. However, if privacy masking is performed in the overview of the scene, it may be difficult to utilize the full potential of the overview of the scene for situational awareness.

SUMMARY

To improve on the above-described situation where (privacy) masking of objects and/or areas in the overview of the scene is used to reduce the required level of authorization needed to view the overview of the scene, but where it would also be desirable to use the overview of the scene to improve situational awareness, the present disclosure provides an improved method of generating an output video stream, and a corresponding device, camera monitoring system, computer program and computer program product as defined in the accompanying independent claims. Various embodiments of the improved method, device, camera monitoring system, and computer program and computer program product are defined in the accompanying dependent claims.

According to a first aspect, there is provided a method of generating an output video stream. The method includes receiving a first input video stream from at least one first camera capturing a scene. The method further includes receiving a second input video stream from a second camera only partially capturing the scene. The method also includes generating an output video stream from the first input video stream, including, in response to determining that a particular area of the output video stream depicts a part of the scene depicted in the second input video stream, refraining from, or at least reducing a level of, a masking of the particular area of the output video stream. In some embodiments, it is envisaged that masking may be refrained from (or reduced) in an area of the output video stream corresponding to the part of the scene depicted in the second input video stream, and that masking may be performed as usual (i.e., not refrained from, or reduced) in one or more other areas of the output video stream not corresponding to the part of the scene depicted in the second input video stream. It should be noted that "refraining from masking" or "reducing a level of masking" implies that if not utilizing the envisaged method which takes the content of the second input video stream into account, such areas would indeed be masked in the output video stream.

The envisaged method improves upon currently available technology and solutions in that it takes into account what is currently seen in the second input video stream from the second camera, and then prevents (or reduces a level of) a masking of a corresponding area in the overview of the scene. By so doing, situational awareness is improved as e.g., an object of interest currently followed in the more detailed view of the scene is also made visible in the overview of the scene, and in particular in that such "unmasking" in the overview of the scene is performed dynamically and adapts to changes in the FOV of the second camera.

In some embodiments, determining that the particular area of the output video stream depicts the part of the scene depicted in the second input video stream may include comparing a field-of-view (FOV) of the at least one first camera to a field-of-view of the second camera. As used herein, a FOV of a camera may include e.g., a position of the camera relative to the scene or at least relative to another camera, a zoom-level (optical or digital) of the camera, a tilt/pan/rotation of the camera, or similar. By comparing the FOVs of two cameras, it may thus be determined whether two cameras capture a same part of a scene or not, and in particular what area of an image captured by one camera that corresponds to a part of the scene captured by the other camera. In other embodiments, it is envisaged that other techniques may also be used to achieve the same effect, and be based on e.g., image analysis and feature identification instead of FOV-parameters of the cameras.

In some embodiments, the method may include generating the output video stream from a plurality of first input video streams from a plurality of first cameras each capturing part of the scene. The particular region of the output video stream may depict all of the scene captured by at least one of the plurality of first cameras (e.g., as depicted in at least one of the plurality of first input video streams). For example, it is envisaged that two or more cameras may be arranged such that they are aimed in different directions, and therefore captures different parts of the scene (with perhaps some overlap, but not necessarily). The input video streams from these cameras may then be combined into a single composite video stream on which the video output stream is based. The video streams from each camera may e.g. be stitched together to create the illusion of having received only a single input video stream from a very large-FOV camera. In other embodiments, the input video streams from each first camera may instead be shown next to each other in the output video stream, such as in e.g., a horizontal array, a vertical array, and/or in a grid, or similar.

In some embodiments, the masking may include pixelating the particular area of the output video stream. Reducing the level of the masking may include reducing a block-size used for the pixelation of the particular area of the output video stream. This may be advantageous in that a resolution of e.g., an object of interest may be the same in both the output video stream and in a second output video stream showing the second input video stream.

In some embodiments, the method may further include determining, based on the first input video stream, that an extended area of the output video stream which includes the particular area is an area to be masked. The method may include masking at least a part of the extended area outside the particular area in the output video stream. Phrased differently, it is envisaged that part of an otherwise desired larger mask may still be kept, and only to "unmask" the particular area of such a larger mask corresponding to a part of the scene which is also captured by the second camera.

In some embodiments, the extended area of the output video stream may be a predefined area of the first input video stream, or, if phrased differently, that the extended area of the output video stream corresponds to a predefined part of the scene. Such a predefined area/part of the scene may e.g., be manually set when configuring the camera monitoring system, in order to e.g., statically mask one or more features or areas of the scene where it is known in advance that e.g., people normally occur or reside. Such features and/or areas may e.g., be windows to residential buildings, windows to coffeeshops or restaurants, daycare centers, playgrounds, outside serving areas, parking lots, bus or train stops, etc.

In some embodiments, the part of the scene depicted in the second input video stream may be defined as a part of the scene including at least one object of interest. Phrased differently, the otherwise desired masking of the first input video stream and the output video stream may be more dynamic and not static, and follow e.g., persons or other objects as they move within the scene, and where masking is only performed first after it is also determined that the person and/or objects are such that they should otherwise (if not refraining from masking them in accordance with the envisaged method) be masked. For example, masking of an object may be desired only if it is first determined (by using e.g., object detection or similar) that the object belongs to a class (such as persons, license plates, etc.) which is to be masked.

In some embodiments, the part of the scene depicted in the second input video stream may be defined as all of the scene depicted in a predefined area of the second input video stream, such as e.g., a whole area of the second input video stream. In other embodiments, the predefined area of the second input video stream may correspond to less than a whole area of the second input video stream. For example, it may be envisaged to detect in which area of the second input video stream e.g., an object of interest is located, and to only unmask (or rather, refrain from masking) the part of the first input video stream in the output video stream which corresponds to this area, thus "unmasking" a smaller area of the scene in the output video stream than what is captured by the second camera.

In some embodiments, the method may be performed in a camera arrangement. The camera arrangement may include the at least one first camera and the second camera. In other embodiments, it is envisaged that the at least one first camera and the second camera are provided as separate cameras, not forming part of a same camera arrangement, and that the method is then performed in either of the cameras, or e.g., jointly by all cameras (assuming the cameras has some way of communication with each other).

According to a second aspect of the present disclosure, there is provided a device for generating an output video stream. The device includes a processor. The device further includes a memory storing instructions that, when executed by the processor, cause the device to: receive a first input video stream from at least one first camera capturing a scene; receive a second input video stream from a second camera only partially capturing the scene, and generate an output video stream from the first input video stream, including, in response to determining that a particular area of the output video stream depicts a part of the scene depicted in the second input video stream, refraining from, or at least reducing a level of, a masking of the particular area of the output video stream.

The device according to the second aspect is thus configured to perform the corresponding steps of the method of the first aspect.

In some embodiments, the device is further configured (i.e., the instructions are such that they when executed by the processor cause the device) to perform any of the embodiments of the method described herein.

In some embodiments, the device is one of the at least one first camera and the second camera. In other embodiments of the device, the device is a camera arrangement which includes all of the at least one first camera and the second camera.

According to a third aspect of the present disclosure, a camera monitoring system is provided. The camera monitoring system includes at least a first camera, a second camera, and a device as envisaged herein according to the second aspect (or any embodiment thereof).

According to a fourth aspect of the present disclosure, a computer program for generating an output video stream is provided. The computer program product is configured to cause, when executed by a processor of a device (e.g., a device according to the second aspect or any embodiments thereof), cause the device to: receive a first input video stream from at least one first camera capturing a scene; receive a second input video stream from a second camera only partially capturing the scene, and generate an output video stream from the first input video stream, including, in response to determining that a particular area of the output video stream depicts a part of the scene depicted in the second input video stream, refraining from, or at least reducing a level of, a masking of the particular area of the output video stream.

The computer program according to the fourth aspect is thus configured to cause the device to perform the method according to the first aspect.

In some embodiments of the computer program, the computer program is further configured to cause the device to perform any embodiment of the method of the first aspect as described herein.

According to a fifth aspect of the present disclosure, a computer program product is provided. The computer program product includes a computer readable storage medium storing a computer program according to the fourth aspect (or any embodiments thereof as described herein). The computer readable storage medium may for example be non-transitory, and be provided as e.g., a hard disk drive (HDD), solid state drive (SDD), USB flash drive, SD card, CD/DVD, and/or as any other storage medium capable of non-transitory storage of data.

Other objects and advantages of the present disclosure will be apparent from the following detailed description, the drawings and the claims. Within the scope of the present disclosure, it is envisaged that all features and advantages described with reference to e.g., the method of the first aspect are relevant for, apply to, and may be used in combination with also any feature and advantage described with reference to the device of the second aspect, the monitoring camera system of the third aspect, the computer program of the fourth aspect, and/or the computer program product of the fifth aspect, and vice versa.

BRIEF DESCRIPTION OF THE DRAWINGS

Exemplifying embodiments will now be described below with reference to the accompanying drawings, in which.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the Figures, the (absolute or relative) sizes of elements and regions may be exaggerated or understated vis-à-vis their true values for illustrative purposes and, thus, are provided to illustrate the general structures of the embodiments.

DETAILED DESCRIPTION

Figure 1:
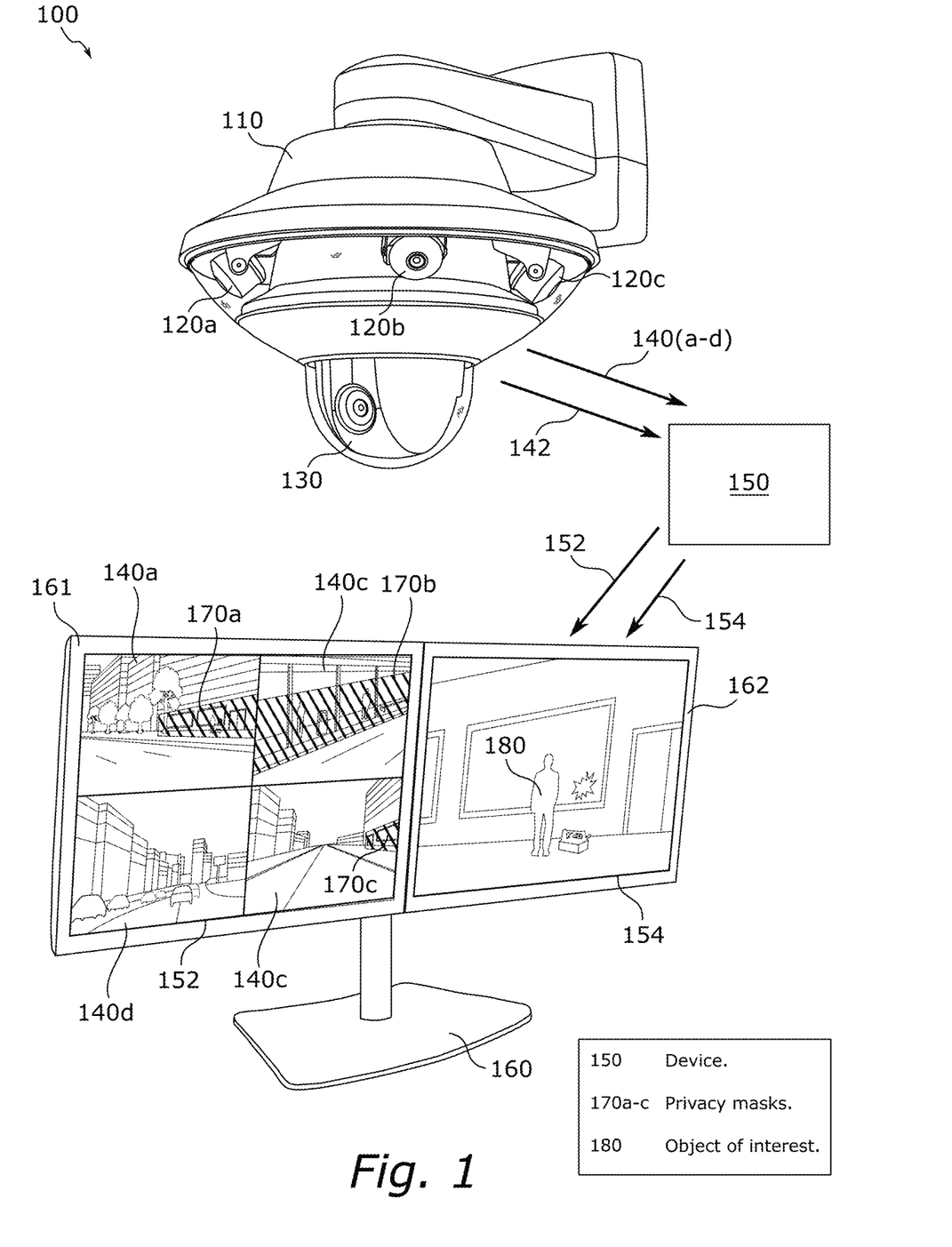
FIG. 1 schematically illustrates a generic camera monitoring system.

FIG. 1 schematically illustrates a generic camera monitoring system 100, including a camera arrangement 110, a device 150, and a user terminal 160. The camera arrangement 110 includes four first cameras 120 (of which only three cameras 120a, 120b and 120c are visible in FIG. 1) and a second camera 130. The first cameras 120 are overview cameras which are mounted in a circular pattern, and each aimed in different directions such that they together capture e.g., a 360 horizontal-degree view of a scene. The second camera 130 is a pan-tilt-zoom (PTZ) camera, and is mounted below the first cameras 120 and in the center of the circular pattern (if viewed e.g., from above or below).

The first cameras 120 generate first input video streams 140 (i.e., four input video streams 140a-d if there are four first cameras 120), while the second camera generates a second input video stream 142. The input video streams 140 and 142 are provided to a device 150. The device 150 is configured to receive the input video streams 140 and 142 and to generate corresponding output video streams 152 and 154.

The output video streams 152 and 154 are provided by the device 150 to the user terminal 160, wherein the first output video stream 152 is displayed on a first monitor 161 of the terminal 160, and wherein the second output video stream 154 is displayed on a second monitor 162 of the terminal 160. In the particular example of the system 100 illustrated in FIG. 1, there are four first input video streams 140a-d (one from each camera 120) provided to the device 150, and the device 150 in turn combines the first input video streams 140a-d into the single, combined first output video stream 152. For example, the device 150 may be such that it arranges the input video streams 140a-d into a 2×2 grid, such that each quadrant of the 2×2 grid displays one first input video stream from a corresponding first camera. Other alternative arrangements of such multiple first input video streams into a single, combined first output video stream are of course also envisaged. The various first input video streams may e.g., also be stitched together to create a panoramic first output video stream, or similar.

Herein, it may be envisaged that the device 150 is a standalone-device separate from the camera arrangement 110 and the user terminal 160. In other embodiments, it may instead be such that the device 150 is an integrated part of either the camera arrangement 110 or the user terminal 160.

A user of the terminal 160 may use the first output video stream 152 displayed on the first monitor 161 for situational awareness, while the second output video stream 154 displayed on the second monitor 162 can be used to provide more details about a particular part of the scene. For example, the user may detect an object or area of interest by looking at the first monitor 161, and then adjust a field-of-view (FOV) of the second camera 130 such that the second camera 130 captures the object or area of interest in more detail. For example, the FOV of the second camera 130 can be adjusted such that the second output video stream 154 displayed on the second monitor 162 provides a zoomed-in view of the particular object or area of interest, e.g., by zooming, panning, rotating, and/or tilting the second camera 130 accordingly. In order to obtain situational awareness, e.g., to still keep track of where in the scene the zoomed-in-on object is currently located, the first output video stream 152 displayed on the first monitor 161 can be used.

The adjusting of the FOV of the second camera 130 may also be automated, such that if an object or area of interest is detected in the first input video stream (s) 140 and/or in the corresponding first output video stream 152 (e.g., by using object detection and/or tracking algorithms), the FOV of the second camera 130 is adjusted such that the second input video 142 stream (and thereby also the corresponding second output video stream 154) provides a close-up view of the detected object or area of interest when displayed on the second monitor 162. Instead of using a physical/optical zoom-in (i.e., by adjusting a lens of the second camera 130), it may also be envisaged to e.g., use digital zooming such that the second input video stream 142 is not altered.

For reasons of privacy, it may be required (e.g., by local laws) that one or more "sensitive" parts of the scene are masked, such that e.g., identities or other personal features of objects, vehicles, or similar, present in these parts of the scene are not derivable from looking at the first monitor 161. Such sensitive parts may for example correspond to shopping windows, windows of residential buildings, bus or train stops, restaurants, coffee shops, or similar, where e.g., persons are likely to be present in the scene. For this purpose, the camera system 100 and the device 150 are thus configured such that when generating the first output video stream 152, one or more privacy masks are applied. In the particular example illustrated in FIG. 1, there are three such privacy masks 170a, 170b and 170c applied. The first privacy mask 170a is in front of a part of the scene including a store, the second privacy mask 170b is in front of a part of the scene including a bus stop, while the third privacy mask 170c is in front of a residential flat located on a bottom/ground floor of a building. In FIG. 1, these privacy masks are shown as hatched lines, but it may of course be such that they are instead fully opaque such that no details about persons or similar behind the masks are obtainable by looking at the first monitor 161. In other embodiments, the privacy masks 170a-c may be created by e.g., pixelating the relevant areas, or even be such that the objects which are to be masked are made transparent (which is e.g., possible if an image of the scene without the objects are available from before). Other ways of masking an object are also envisaged.

In the particular example illustrated in FIG. 1, a particular object of interest 180 is present in the first input video stream 140a, and consists of a person currently trying to break into the store. The person 180 appears to have smashed a shopping window of the store, and a user of the terminal 160 is thus interested in following the progress of the break-in such that the whereabouts of the person 180 can be tracked in real-time. A close-up view of the person 180 is provided in the second output video stream 154 displayed on the second monitor 162, e.g., by adjusting the FOV of the second camera 130 accordingly. There are no privacy masks applied in the second output video stream 154.

As was previously mentioned herein, the system 100 is often configured such that the level of authorization required to view the first output video stream 152 is lower than that required to view the second output video stream 154. This because the overview of the scene provided by the first output video stream 152 contains less details about individual objects in the scene, and i.e., because there are privacy masks 170a-c applied before the user can view the first output video stream 152 on the first monitor 161. In a situation such as illustrated in FIG. 1, it is however desirable for a user of the terminal 160 to use the first output video stream 152 for situational awareness, such that the user may more easily know where in the scene the person 180 is currently located. For example, if the person 180 starts to move, it may be hard to know where in the scene the person 180 is currently located by only looking at the second terminal 162. Knowledge of the current location of the person 180 may e.g., be important if calling law enforcement or similar. However, due to the privacy masks 170a-c, such situational awareness is hindered as the masks 170a-c hides the person 180 in the first output video stream 152, and therefore make it more difficult to utilize the first output video stream 152 displayed on the first monitor 161 for such situational awareness.

How a method as envisaged herein can help to improve upon the above-described situation will now be described in more detail with reference also to FIGS. 2A through 2C.

Figure 2A:
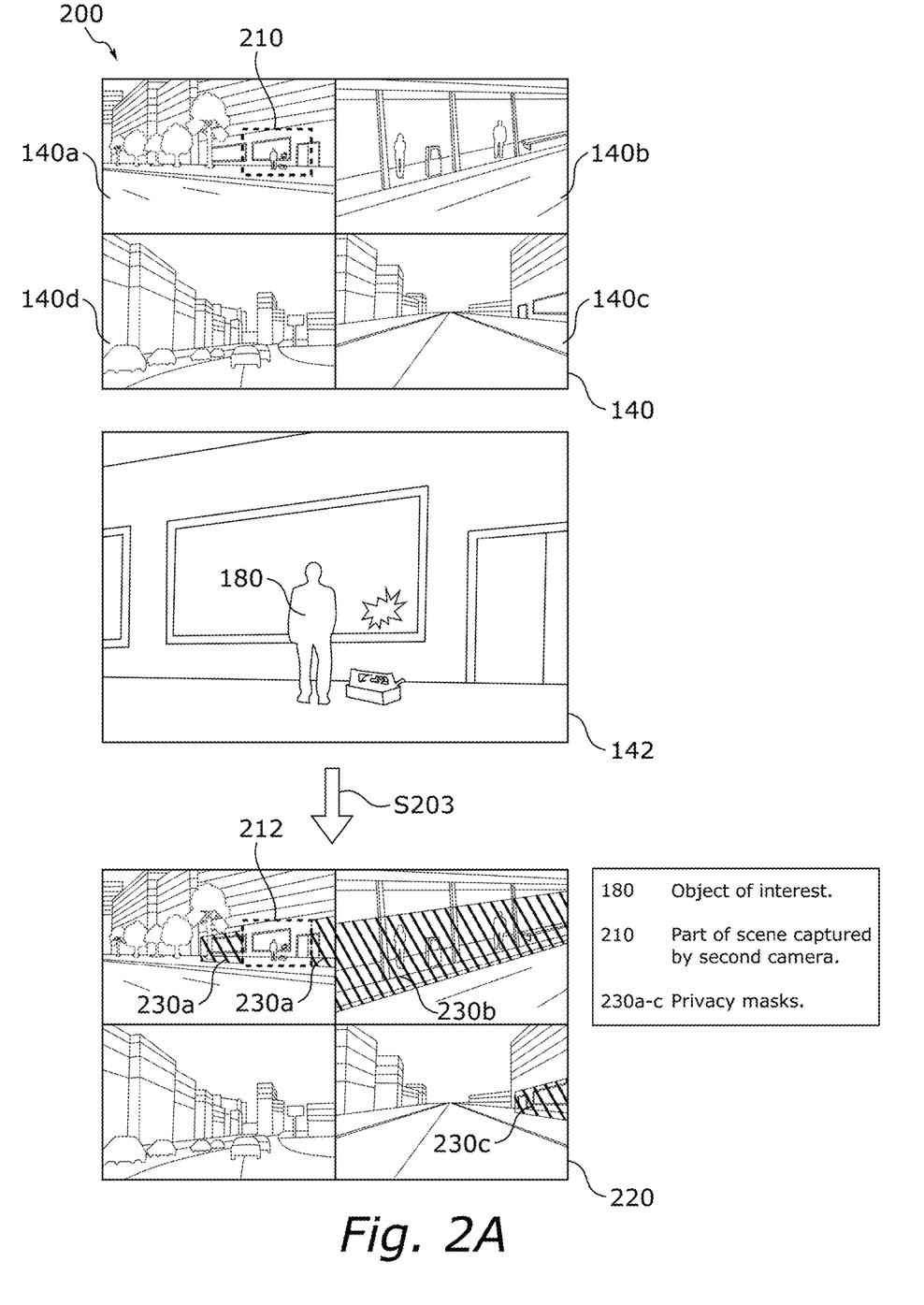
FIG. 2A schematically illustrates an embodiment of generating an output video stream according to the present disclosure.
Figure 2B:
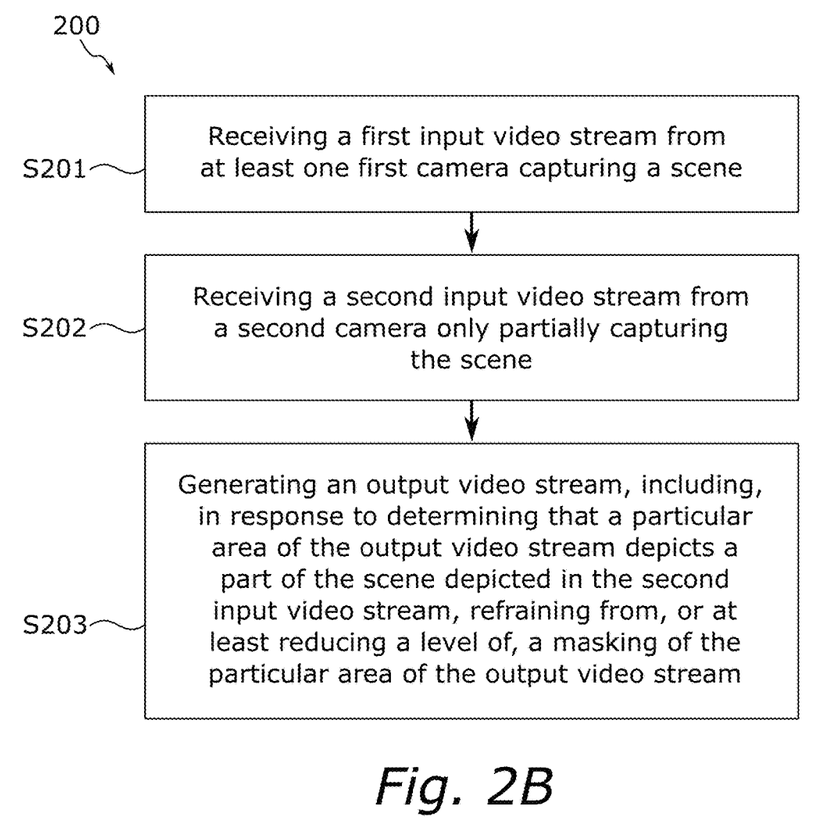
FIG. 2B schematically illustrates a flowchart of an embodiment of a method according to the present disclosure.

FIG. 2A schematically illustrates an envisaged embodiment of a method 200 of generating an output video stream, while FIG. 2B schematically illustrates a flowchart of various steps included in such a method 200. In a first step S201, a first input video stream 140 is received from at least one first camera (such as one or more of cameras 120a-c), where the first input video stream 140 captures/depicts a scene. In a second step (S202, which may also be performed before, or simultaneously with, step S201), a second input video stream 142 is received from a second camera (such as the camera 130). The second input video stream 142 captures/depicts only a part of the scene. For example, a FOV of the second camera 130 is less than a FOV (or combined FOV) of the first camera (or first cameras) 120. Phrased differently, the second input video stream 142 provides a close-up view of an object or area of the scene. As discussed earlier herein, such a result may be obtained e.g., by mechanically/optically zooming (i.e., by moving a lens of) the second camera 130, or e.g., by digitally zooming. In the latter case, even though the second input video stream 142 generated by the second camera 130 is then not necessarily changed in order to generate the second output video stream 154, for the purpose of explaining the envisaged improved method it may anyway be assumed that the second input video stream 142 thus only partially captures the scene.

The envisaged method 200 then proceeds with generating, in a third step S203, an output video stream 220 from the first input video stream 140, as will now be described. To generate the output video stream 220, it is first determined whether a particular area 212 of the resulting output video stream 220 depicts a part 210 of the scene depicted in the second input video stream 142. If affirmative, the generation of the output video stream 220 refrains from, or at least reduces a level of, a masking of the particular area 212 of the output video stream.

In the example illustrated in FIG. 2A, the second input video stream 142 includes a close-up view of the person 180 and depicts a part of the scene also found in the first input video stream 140, as illustrated by the dashed rectangle 210. To find the position and size of the rectangle 210, it is envisaged that one may use e.g., knowledge about, and compare, a current FOV of the second camera 130 and knowledge about a current FOV of one or more first cameras 120. In the envisaged method 200, it may then be confirmed that a particular area 212 of the corresponding output video stream 220 depicts a same part of the scene as the second input video stream 142, namely as indicated by the dashed rectangle 210. As used herein, having knowledge about a FOV of a camera includes knowing e.g., a position of the camera with respect to the scene (and/or with respect to one or more other cameras), a zoom-level (optical/mechanical and/or digital) of the camera, an orientation of the camera (e.g., a pan, tilt, and/or roll of the camera), and similar. By comparing the FOVs of two cameras, it may thus be calculated whether e.g., a first camera depicts a same part of the scene as depicted by a second camera, and in particular which area of a video stream generated by the first camera that corresponds to this same part of the scene.

When applying one or more privacy masks 230a-c to, as already discussed with reference to FIG. 1, mask e.g., the store, the bus stop and the residential flat, the envisaged method 200 does not apply masking in the particular area 212 of the output video stream 220. As a result, the situational awareness about the scene which is obtainable from the output video stream 220 is thus enhanced, as there is no mask covering the person 180. If the person 180 e.g., starts to move, the person 180 will not be masked in the output video stream 220 as long as the person 180 remains within the FOV of the second camera 130 generating the second input video stream 142. It may e.g., be envisaged that the second camera 130 tracks the person 180 (either by manual control by the user, or e.g., using e.g., object detection and/or tracking), and that the particular area 212 of the output video stream 220 is thus updated as the FOV of the second camera 130 changes, such that the person 180 remains unmasked in the output video stream 220. If using the envisaged method to improve the generic camera monitoring system 100 illustrated in FIG. 1, the device 150 may e.g., be configured to perform the improved method 200, and e.g., to replace the first output video stream 152 with the output video stream 220, such that the output video stream 220 is displayed on the first monitor 161 instead of the first output video stream 152.

In the example illustrated in FIG. 2A, the particular area 212 of the output video stream 220 in which it is refrained from masking corresponds to a whole of the part of the scene captured/depicted in the second input video stream 142. Phrased differently, the part of the scene depicted in the second input video stream 142 is defined as all of the scene depicted in a predefined area of the second input video stream 142, such as e.g., a whole area of the second input video stream 142. In other embodiments, it may of course also be such that the particular area 212 of the output video stream 220 in which it is refrained from masking corresponds only to a part of the scene captured/depicted in the second input video stream 142. For example, it may be envisaged to refrain from masking only 90% of the part of the scene captured/depicted in the second input video stream 142, only 80%, only 75%, etc. In such a situation, the predefined area of the second input video stream 142 may be less than a whole area of the second input video stream 142. In any embodiment, the important thing is that masking is refrained from in a sufficient area of the output video stream 220 sufficient to allow an object and/or area of the scene of interest to be visible in the output video stream 220.

Figure 2C:
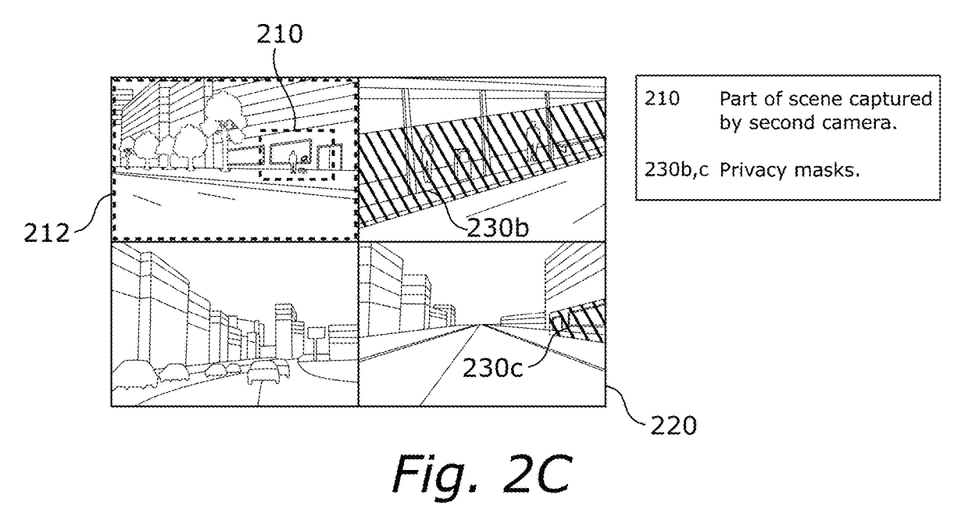
FIG. 2C schematically illustrates an alternative embodiment of a method according to the present disclosure.

FIG. 2C schematically illustrates another embodiment of the envisaged method, showing only the resulting output video stream 220. In the output video stream 220, refraining from masking is instead performed in all of the scene captured by one of the first input cameras 120 (i.e., in an area of the output video stream 220 potentially corresponding to a larger part of the scene than as captured by the second camera 130). Here, even though the part of the scene depicted in the second input video stream 142 corresponds only to the area marked by the dashed rectangle 210, the particular area 212 of the output video stream in which masking is refrained from is the area depicting all of the scene captured by one of the cameras 120. Phrased differently, in this embodiment, the first input video stream 140 is a composite video stream from a plurality of first cameras 120 (such as cameras 120a-c) each capturing part of the scene, and the particular region 212 of the output video stream 220 depicts all of the scene captured by at least one of the plurality of first cameras 120. In other situations, wherein e.g., the dashed rectangle 210 would span the input video streams from more than one of the first cameras 120, it may be envisaged to e.g., refrain from masking in all of the parts of the scene captured by the corresponding first cameras 120.

Contrary to what is illustrated in FIG. 2C, and as already explained with reference to e.g., FIG. 2A, the present disclosure envisages also that the particular area 212 of the output video stream 220 is part of a larger extended area of the output video stream 220 in which it is determined that masking is otherwise supposed to be applied. Phrased differently, after having refrained from masking in the particular area 212, there may be other areas of the output video stream 220 in which masking is still performed, such that e.g., at least a part of the extended area outside the particular area 212 of the output video stream 220 is still masked. An advantage of the proposed and envisaged method 200 is thus that it allows to improve situational awareness without performing unmasking of areas of the scene not related to e.g., a currently tracked object of interest, i.e., such that privacy of objects may still be respected as long as their positions within the scene does not coincide with the tracked object.

As used herein, the extended area of the output video stream 220 may e.g., be a predefined area of the first input video stream 140. The extended area may e.g., be statically defined using for example a video management system (VMS) or similar, e.g., by the user manually drawing/marking one or more polygons in which masking is to be applied. This may be useful if e.g., the first cameras 120 are static and always capture a same part of the scene. In other embodiments, it is envisaged instead that the extended areas in which masking is to be performed (except for the particular area) are dynamic, and may change with time, and be based on e.g., object detection and/or tracking algorithms analyzing the various input video streams to detect/track objects classified as sensitive and for which masking should normally be applied. The envisaged method therefore enables to overrule such masking decisions if the second camera 130 is currently following an object of interest, such that the object of interest remains unmasked in the overview of the scene provided by the output image stream 220 (and as e.g., displayed on the first monitor 162 of the user terminal 160).

In another embodiment of the method 200, it is envisaged that instead of completely refraining from masking in the particular area 212, a level of masking is instead changed (i.e., reduced). In such an embodiment, masking is usually performed by increasing a level of pixelation of an object. For example, by dividing an input image of an input image stream into blocks of M×M pixels (where M is an integer), each pixel in such a block may be replaced by an average pixel value in the block. By increasing the size of the blocks (i.e., by increasing M), the level of detail in the image may thus be reduced, as a pixel block of size M=1 would correspond to doing no masking/pixelation at all, while a pixel block where M equals i.e., a full width and/or height of the image would render all of the image as having a same color (corresponding to an average color of all original pixels). In the method as envisaged herein, it may be assumed that masking is performed by doing such M×M-block averaging at least in an area of the output video stream 220 where a sensitive area or object is located. For example, masking may be performed by a pixelation block-size of size 8×8. In the particular area 212 of the output video stream 220, a level of masking may therefore be obtained by reducing the block-size used for pixelation to e.g., 4×4 or 2×2 (or even 1×1, which would equal removing the masking completely). This would be particularly useful if e.g., resolution of the first camera(s) 120 is larger than a resolution of the second camera 130, as a level of masking of the output video stream 220 is then adapted such that it matches the resolution level of the second camera 130 (on the first monitor 161). By so doing, the user of the terminal 160 would see the object of interest 180 with the same resolution both on the first monitor 161 and on the second monitor 162. As an example, using the camera monitoring system 100 illustrated in FIG. 1, it can be assumed that each of the four first cameras 120 has a 4K-resolution (e.g., 3840×2160), while the second camera 130 has a 1080p-resolution (e.g., 1920×1080). The first cameras 120 may e.g., be arranged to each cover 90 degrees of horizontal FOV (therefore together generating a 360-degree view of the scene, not taking any overlap between the first input video streams 140 into account). In other embodiments, there may be only a single 4K-resolution first camera 120 arranged to cover 90 degrees of horizontal FOV. The second camera 130 may be such that it covers a 90-degree horizontal FOV when fully zoomed-out. As a consequence, a pixel density of the second camera 130 will correspond to a pixelation block-size of 2×2 in the output video stream 220. If the second camera 130 is zoomed in, the corresponding pixelation block-size in the output video stream 220 would instead be 1×1, e.g., no pixelation/masking. In a situation where the second camera 130 is fully zoomed out and masking is normally performed by averaging over e.g., pixel block-sizes of 4×4, 8×8, 16×16, or similar, a level of masking in the particular area 212 of the output video stream 220 may thus be adjusted by reducing the block-size to match that of the second camera 130, e.g., to 2×2. Thus, a pixel density of the person 180 would be the same when viewed both on the first monitor 161 and the second monitor 162 of the terminal 160.

Herein, it is envisaged that the method 200 may be performed by (or in) for example a camera monitoring system (such as the camera monitoring system 100 illustrated in FIG. 1, but with the device 150 reconfigured/replaced to perform the method 200), and/or by a device as will now be described more in detail with reference also to FIG. 3. Such a camera monitoring system is provided by the present disclosure.

Figure 3:
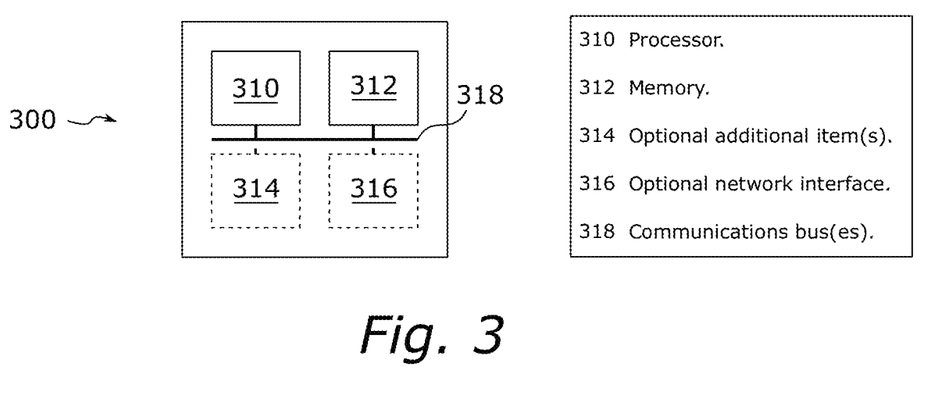
FIG. 3 schematically illustrates various embodiments of a device for generating an output video stream according to the present disclosure.

FIG. 3 schematically illustrates a device 300 for generating an output video stream according to one or more embodiments of the present disclosure. The device 300 includes at least a processor (or "processing circuitry") 310 and a memory 312. As used herein, a "processor" or "processing circuitry" may for example be any combination of one or more of a suitable central processing unit (CPU), multiprocessor, microcontroller (µC), digital signal processor (DSP), application-specific integrated circuit (ASIC), field-programmable gate-array (FPGA), graphics processing unit (GPU), etc., capable of executing software instructions stored in the memory 312. The memory 312 may be external to the processor 310, or may be internal to the processor 310. As used herein, a "memory" may be any combination of random-access memory (RAM) and read-only memory (ROM), or any other kind of memory capable of storing the instructions. The memory 312 contains (i.e., stores) instructions that, when executed by the processor 310, cause the device 300 to perform a method as described herein (i.e., the method 200 or any embodiments thereof). The device 300 may further include one or more additional items 314 which may, in some situations, be necessary for performing the method. In some example embodiments, the device 300 may for example be a camera arrangement such as illustrated in FIG. 1, and the additional item(s) 314 may then include e.g., the one or more first cameras 120 and the second camera 130. The additional item(s) 314 may also include e.g., various other electronics components needed for generating the output video stream. Performing the method in a camera assembly may e.g., be useful in that the processing is moved to "the edge", i.e., closer to where the actual scene is captured compared to if performing the method somewhere else (such as at a more centralized processing server or similar). The device 300 may for example be connected to a network such that the generated output video stream may be transmitted to a user (terminal). For this purpose, the device 300 may include a network interface 316, which may be e.g., a wireless network interface (as defined in e.g., any of the IEEE 802.11 or subsequent standards, supporting e.g., Wi-Fi) or a wired network interface (as defined in e.g., any of the IEEE 802.3 or subsequent standards, supporting e.g., Ethernet). The network interface 316 may for example also support any other wireless standard capable of transferring encoded video, such as e.g., Bluetooth or similar. The various components 310, 312, 314 and 316 (if present) may be connected via one or more communication buses 318, such that these components may communicate with each other, and exchange data as required.

A camera arrangement such as that illustrated in FIG. 1 is convenient as all cameras are provided as a single unit, and as it may be easier to compare the FOVs of the various cameras as the relative positions of the cameras are known already from factory. It is also envisaged that the camera arrangement may include the circuitry required to perform the method 200, e.g., a device 300 as described above, and that the camera arrangement can output e.g., the output video stream 220 and possibly also the second output video stream 152, such that the camera arrangement can be connected to the user terminal directly, without a need for any intermediate device/processing system. In other embodiments, the device for performing the method 200 as envisaged herein may be a separate entity which may be provided between a camera arrangement and a user terminal. Such a camera arrangement, including the functionality to perform the envisaged method 200, is also provided by the present disclosure.

It is also envisaged herein that e.g., the at least one first camera 120 may be provided as its own entity/unit, and that the second camera 130 may also be provided as its own, different entity/unit. For example, a fisheye camera may be used to provide the overview of the scene and be mounted in e.g., a ceiling of a building, or similar, while a PTZ camera may be mounted somewhere else (e.g., on a wall) and used to provide the more detailed view of the scene. In such an arrangement, a device as envisaged herein may e.g., be provided as part of either the one or more first cameras used to generate the overview of the scene or as part of the second camera used to generate the more detailed view of the scene. In other envisaged embodiments, the device is instead provided as a separate entity or as part of the user terminal, and configured to receive the respective input video streams from the various cameras and to generate the output video stream(s).

The present disclosure also envisages to provide a computer program and corresponding computer program product, as previously described herein.

In summary of the various embodiments presented herein, the present disclosure provides an improved way of generating an output video stream containing an overview of a scene, in a system wherein there is an additional, second camera provided for generating a more detailed view of part of the scene. By refraining from masking, or by at least reducing a level of masking, in the output video stream containing the overview of the scene based on what part of the scene that is currently captured by the second camera, the use of the output video stream providing the overview of the scene for situational awareness is improved, and the output video stream can therefore be used to e.g., better learn a position or other whereabouts of an object or area of interest captured by the second camera as e.g., the object moves in the scene.

Although features and elements may be described above in particular combinations, each feature or element may be used alone without the other features and elements or in various combinations with or without other features and elements. Additionally, variations to the disclosed embodiments may be understood and effected by the skilled person in practicing the claimed disclosure, from a study of the drawings, the disclosure, and the appended claims.

In the claims, the words "comprising" and "including" does not exclude other elements, and the indefinite article "a" or "an" does not exclude a plurality. The mere fact that certain features are recited in mutually different dependent claims does not indicate that a combination of these features cannot be used to advantage.

LIST OF REFERENCE NUMERALS

- 100 camera monitoring system
- 110 camera arrangement
- 120 (a-c) first camera
- 130 second camera
- 140 (a-d) first input video stream
- 142 second input video stream
- 150 device
- 152 first output video stream
- 154 second output video stream
- 160 user terminal
- 161 first monitor
- 162 second monitor
- 170a-c (privacy) masks applied in first output video stream
- 180 object of interest
- 200 improved method
- S201-203 improved method steps
- 210 part of scene captured by second camera
- 212 particular area of output video stream
- 220 output video stream
- 230a-c (privacy) masks applied in improved output video stream
- 300 improved device
- 310 processor
- 312 memory
- 314 optional additional item(s)
- 316 optional network interface
- 318 communications bus(es)

The invention claimed is:

1. A computer-implemented method of generating an output video stream, the method being performed by a processor/processing circuitry, the method comprising:
   receiving a first input video stream from at least one first camera capturing a scene;
   receiving a second input video stream from a second camera only partially capturing the scene;
   generating an output video stream from the first input video stream, wherein at least one portion of the scene represented in the output video stream is to be masked;
   comparing the second input video stream to the output video stream;
   determining, based on the comparison, that a particular area of the at least one portion of the scene represented in the output video stream corresponds to at least a part of the scene represented in the second input video stream; and
   refraining from applying a privacy mask to the particular area of the scene represented in the output video stream while applying the privacy mask to the at least one portion of the scene that is outside of the particular area.

2. The method according to claim 1, wherein comparing the second input video stream to the generated output video stream includes comparing a field-of-view of the at least one first camera to a field-of-view of the second camera.

3. The method according to claim 1, wherein the output video stream is generated from a plurality of first input video streams from a plurality of first cameras each capturing part of the scene, and wherein the particular area of the scene represented in the output video stream is captured by at least one of the plurality of first cameras.

4. The method according to claim 1, wherein applying the privacy mask to the at least one portion of the scene that outside of the particular area includes pixelating the at least one portion of the scene that is outside of the particular area reducing a block-size used for the pixelation of the at least one portion of the scene that is outside of the particular area, or changing the transparency of the at least one portion of the scene that is outside of the particular area.

5. The method according to claim 1, further including masking the at least one portion of the scene that is outside of the particular area.

6. The method according to claim 5, wherein the at least one portion of the scene to be masked is determined based on user input.

7. The method according to claim 1, wherein the at least part of the scene represented in the second input video stream comprises the entire scene represented in the second input video stream.

8. The method according to claim 1, being performed in a camera arrangement including the at least one first camera and the second camera.

9. The method according to claim 1, wherein the first input video stream has a different viewing authorization level than the second input video stream.

10. The method according to claim 1, wherein a representation of the output video stream is configured to be displayed separately from a representation of the second video input stream.

11. The method according to claim 1, wherein refraining from applying the privacy mask to the particular area of the scene represented in the output video stream further comprises configuring the particular area of the scene represented in the output video stream to be displayed without masking.

12. The method according to claim 1, wherein refraining from applying the privacy mask to the particular area of the scene represented in the generated output video stream is performed dynamically without user input.

13. The method according to claim 1, wherein the output video stream only includes the first video input stream.

14. The method according to claim 1, wherein the output video stream does not include the second video input stream.

15. The method according to claim 1, wherein a portion of the scene represented in the output video stream includes at least one unmasked portion.

16. The method according to claim 1, further comprising providing the output video stream for display without masking the particular area of the scene represented in the output video stream and masking outside of the particular area of the at least one portion of the scene.

17. A device for generating an output video stream, comprising:
a processor, and
a memory storing instructions that, when executed by the processor, cause the device to:
receive a first input video stream from at least one first camera capturing a scene;
receive a second input video stream from a second camera only partially capturing the scene;
generate an output video stream from the first input video stream, wherein at least one portion of the scene represented in the output video stream is to be masked;
compare the second input video stream to the output video stream;
determine, based on the comparison, that a particular area of the at least one portion of the scene represented in the output video stream corresponds to at least a part of the scene represented in the second input video stream; and
refrain from applying a privacy mask to the particular area of the scene represented in the output video stream while applying the privacy mask to the at least one portion of the scene that is outside of the particular area.

18. The device according to claim 17, wherein the device includes one of the at least one first camera and the second camera.

19. A camera monitoring system, including at least one first camera, a second camera, and a device for generating an output video stream, the device comprising:
a processor, and
a memory storing instructions that, when executed by the processor, cause the device to:
receive a first input video stream from the at least one first camera capturing a scene;
receive a second input video stream from the second camera only partially capturing the scene;
generate an output video stream from the first input video stream, wherein at least one portion of the scene represented in the output video stream is to be masked;
compare the second input video stream to the output video stream;
determine, based on the comparison, that a particular area of the at least one portion of the scene represented in the output video stream corresponds to at least a part of the scene represented in the second input video stream; and
refrain from applying a privacy mask to the particular area of the scene represented in the output video stream while applying the privacy mask to the at least one portion of the scene that is outside of the particular area.

20. A non-transitory computer readable storage medium comprising a computer program for generating an output video stream, configured to, when executed by a processor of a device, cause the device to:
receive a first input video stream from at least one first camera capturing a scene;
receive a second input video stream from a second camera only partially capturing the scene;
generate an output video stream from the first input video stream, wherein at least one portion of the scene represented in the output video stream is to be masked;
compare the second input video stream to the output video stream;
determine, based on the comparison, that a particular area of the at least one portion of the scene represented in the output video stream corresponds to at least a part of the scene represented in the second input video stream; and
refrain from applying a privacy mask to the particular area of the scene represented in the output video stream while applying the privacy mask to the at least one portion of the scene that is outside of the particular area.

\* \* \* \* \*